(12) United States Patent
Hendriks et al.

(10) Patent No.: US 8,036,684 B2
(45) Date of Patent: Oct. 11, 2011

(54) CLOSEST USER TERMINAL SEARCH METHOD FOR A TELECOMMUNICATION NETWORK AND SERVICE NODE APPLYING SUCH A METHOD

(75) Inventors: Jozef Henricus Petrus Hendriks, Tilburg (NL); Erik Jan Reitsma, Zoetermeer (NL); Hugo Zwaal, Breda (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 755 days.

(21) Appl. No.: 11/996,715

(22) PCT Filed: Jul. 29, 2005

(86) PCT No.: PCT/NL2005/000561
§ 371 (c)(1),
(2), (4) Date: Jul. 16, 2008

(87) PCT Pub. No.: WO2007/013796
PCT Pub. Date: Feb. 1, 2007

(65) Prior Publication Data
US 2009/0006376 A1 Jan. 1, 2009

(51) Int. Cl.
*H04W 24/00* (2009.01)
(52) U.S. Cl. ............... 455/456.5; 455/456.1; 455/41.2; 455/519

(58) Field of Classification Search ........ 455/456.1–457, 455/404.1–404.2, 517–519, 41.2
See application file for complete search history.

(56) References Cited

U.S. PATENT DOCUMENTS

| 5,485,634 | A * | 1/1996 | Weiser et al. .............. 455/507 |
| 6,628,938 | B1 * | 9/2003 | Rachabathuni et al. ... 455/456.3 |
| 7,133,685 | B2 * | 11/2006 | Hose et al. ............... 455/456.1 |
| 7,509,131 | B2 * | 3/2009 | Krumm et al. ............ 455/456.1 |
| 7,548,758 | B2 * | 6/2009 | Periyalwar et al. .......... 455/517 |
| 7,633,914 | B2 * | 12/2009 | Shaffer et al. .............. 370/338 |
| 7,949,359 | B2 * | 5/2011 | Pan ........................... 455/518 |
| 2002/0107008 | A1 * | 8/2002 | Hendrey et al. ............. 455/416 |
| 2010/0317392 | A1 * | 12/2010 | Davis et al. ................ 455/518 |

* cited by examiner

*Primary Examiner* — Sharad Rampuria

(57) ABSTRACT

Service node for a telecommunication network (15) and method for determining a group of n user terminals (21) which are closest to a point of interest (22). First, a search range with an upper limit (24) is set. Then in an iterative manner, a current search cell of the set of cells (1-10) is determined and the search cell is queried for user data. The user terminals (21) are added to a set of found user terminals, and if the set of found user terminals comprises n or more user terminals (21), the upper limit (24) of the search range is adjusted to the $n^{th}$ lowest distance. This is repeated until no further possible cell (1-10) can be determined. The set of criteria can be set and matched with obtained user data to find a closest user terminal (21) having a specific role.

16 Claims, 6 Drawing Sheets

CLOSEST USER TERMINAL SEARCH METHOD FOR A TELECOMMUNICATION NETWORK AND SERVICE NODE APPLYING SUCH A METHOD

FIELD OF THE INVENTION

The present invention relates to a method of determining a group of n user terminals in a telecommunication network which are closest to a point of interest (e.g. nearest in a geographical sense), n being an integer value. In a further aspect, the present invention relates to a service node for a telecommunication network comprising a set of cells with a predetermined coverage area servicing user terminals, in which the service node is connectable to an application server executing an application for determining a group of n user terminals which are closest to a point of interest in the predetermined coverage area.

PRIOR ART

In some applications in a telephony network, the application searches for the (e.g. geographically) closest particular user of a handset to a point of interest. This particular user may satisfy some criteria (e.g. being part of a list of medical urgency personnel) which may be dependent on the particular application. In existing telephony network systems, this requires first to determine which users satisfy the given criteria, determine the location of all of those users, and to determine which user is closest to the point of interest. All these steps require a lot of requests and messages being transmitted in the telephony network, which is expensive and claims network capacity.

SUMMARY OF THE INVENTION

The present invention seeks to provide an improved method and system, in which the total number of requests and messages associated with the application of finding a closest user terminal (or a group of closest user terminals) is reduced.

According to the present invention, a method according to the preamble defined above is provided, comprising:

a) determining a set of cells of the network, each having an associated distance range to the point of interest with a minimum and maximum value, and setting a search range with an upper limit;

b) determining a current search cell of the set of cells which has the lowest minimum value lower than the upper limit;

c) querying the current search cell for user data associated with user terminals in the current search cell (such as presence, location, etc), adding the user terminals to a set of found user terminals, and if the set of found user terminals comprises n or more user terminals adjusting the upper limit of the search range to the $n^{th}$ lowest distance between each of the user terminals in the group and the point of interest;

d) repeating the steps b) and c) until no further cell having a minimum value lower than the upper limit can be determined;

e) determining the group of n closest user terminal as the n user terminals in the queried cells having the n lowest distances to the point of interest.

For some applications searching for user terminals it is only relevant to find the closest relevant user terminal. The present invention makes sure that the applicable user terminal is found using the cell identity with as few user data (location) requests as possible given any user terminal distribution. The present invention also makes sure that as many cells as possible will be excluded before doing the actual user data (location) requests. This will result in fewer user data (location) requests and therefore less power and network resource usage. The repetition of the steps b) and c) may be implemented by keeping track which cell has already been searched and finding the cell which is next closest to the point of interest, or as an alternative, a lower limit of the search range may be set to the minimum value of the current search cell each iteration.

In a further embodiment, setting the search range comprises setting the upper limit equal to a predetermined maximum value. In this manner, the upper limit can be set at a value independent of the coverage area of the set of cells, in order to limit the initial search range to a maximum value (e.g. depending on an expected time to travel from the present user location to the point of interest). Alternatively, an initial search range is limited to the coverage area of the set of cells chosen to be included in the search, by setting the lower limit to the lowest minimum value and the upper limit to the highest maximum value.

In some circumstances, the set of cells may comprise two or more cells each having an equal minimum distance value to the point of interest. For the present method, such cells are considered as a single current search cell, and the lower limit is reset to this minimum value in the relevant step.

In a further embodiment, the user data comprises position data, and the position data is used to calculate the distance between the user terminal and the point of interest. The position data may be obtained in a number of different manners, e.g. using radio triangulation (as such known from e.g. GSM networks), obtaining data from a GPS unit in the user terminal, or by having the user input location data in the user terminal.

In order to enhance the efficiency of the present method, the minimum value of a cell is adapted to exclude an overlapping area of a further cell closer to the point of interest in a further embodiment. In some circumstances this will allow to exclude that cell from the user data query, as the adapted minimum distance to the point of interest to the coverage area may be higher than the upper limit of the search range.

The present method may be extended to include fixed user terminals, which are e.g. connected to a fixed network, such as the public switched telephone network. In a further embodiment, a user terminal comprises a terminal with a fixed and known location. As the location is fixed and known, the distance to a point of interest may be calculated and included in the present method embodiments.

In the embodiments of the present invention, a search may be performed for finding a user terminal having a specific role, e.g. a user terminal in the possession of medical staff or other emergency personnel. The determination whether a user terminal is a specific user terminal satisfying a set of criteria may be implemented in various manners. In one particular embodiment, a user terminal in a cell is added to the set of found user terminals if the associated user data obtained from the cell matches a set of criteria. By applying the criteria to the data obtained from a cell query, it is assured that the most up to date information is used for determining a specific user terminal.

In some cases it is necessary to determine more than one nearest user terminal for different roles, e.g. an ambulance and a policeman. To this end, the present method is performed in parallel for a number of different sets of criteria, using the same current search cell for each of the different sets of criteria. As a result, a lowest possible number of cell queries is obtained.

In a further aspect, a service node according to the preamble defined above is provided, in which the service node is connectable to a first network unit arranged to obtain information from the telecommunication network for determining a distance range to the point of interest with a minimum and a maximum value for each of the set of cells, and to a second network unit arranged to query a cell for user data associated with the user terminals being serviced in the cell. The second network unit may be implemented in several network units, each providing a different kind of user data, e.g. a cell query unit providing data regarding which user terminals are in a cell and further data related to these user terminals, and a positioning unit providing location data of user terminals. The service node is arranged for a) setting a search range with an upper limit;

b) determining a current search cell of the set of cells which has the lowest minimum value lower than the upper limit;

c) querying the second network unit for user data associated with user terminals in the current search cell, adding the user terminals to a set of found user terminals, and if the set of found user terminals comprises n or more user terminals, adjusting the upper limit of the search range to the $n^{th}$ lowest distance between each of the user terminals in the group and the point of interest;

d) repeating the steps b) and c) until no further cell having a minimum value lower than the upper limit can be determined; and e) determining the group of n closest user terminal as the n user terminals in the queried cells having the n lowest distances to the point of interest. In further embodiments, the service node may be further arranged to execute functions corresponding to the various method embodiments discussed above.

In an even further aspect, the present invention relates to a computer program product comprising executable code, which when loaded in a processing system of a service node for a telecommunication network, provides the service node with the ability to perform embodiments of the present method.

Short description of drawings

The present invention will be discussed in more detail below, using a number of exemplary embodiments, with reference to the attached drawings, in which FIG. 1 shows a simplified diagram of a telecommunication network;

DETAILED DESCRIPTION OF EXEMPLARY EMBODIMENTS

Figure 1:
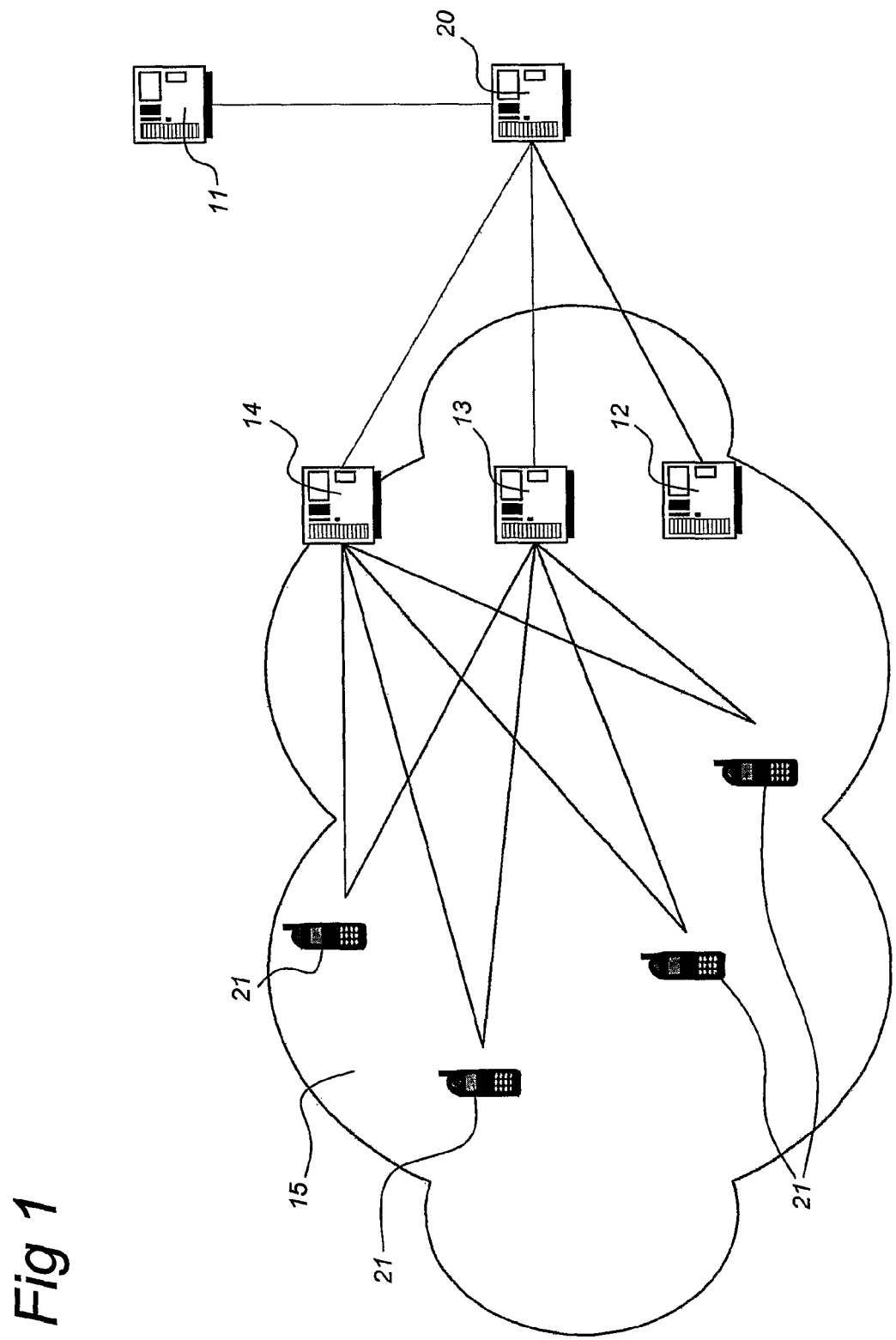

In FIG. 1, a simplified diagram of a telecommunication network is shown in which embodiments of the present invention may be applied, using a mobile telephony network as an exemplary embodiment. The telecommunication network is e.g. a GSM network, in which network cells provide a cellular type of geographical coverage area 15, in which a number of user terminals 21 (e.g. mobile telephones) can be serviced. An application server 11 (e.g. a personal computer or server computer) runs an application, and interfaces with a service node 20 of the telecommunication network for obtaining data regarding the mobile user terminals 21. The service node 20 may comprise one (or more) processors and associated memory, and is able to execute a software program stored in that memory or provided on a computer program product loadable in the service node 20, as is known to the skilled person. The service node 20 is connected to various units 12-14 of the telecommunications network. A first unit 12 is arranged to provide information regarding the exact geographical area covered by each cell of the network, as well as details on which cells are overlapping, and how much area is overlapping. A second unit 13 is arranged to determine for each cell which relevant user terminals 21 are in that cell. Which user terminal 21 is a relevant user terminal 21 for a specific application, can be determined in various manners, as will be explained below. Finally, a third unit 14 is arranged to provide positional information in relation to the user terminals 21, e.g. in geographic coordinates. This third unit 14 may use one of several possibilities to obtain positional information from the user terminals 21. E.g. radio triangulation may be used to determine a position using a number of cell base stations. Alternatively, the positional information may be obtained directly from the user terminal 21. The user terminal 21 may be equipped with a location device (e.g. a GPS unit), or a location may be input by the user. The units 12-14 are functional units and may be separate units in the telecommunication network, but may also be implemented in combination in one or two units in the telecommunication network.

Figure 2:
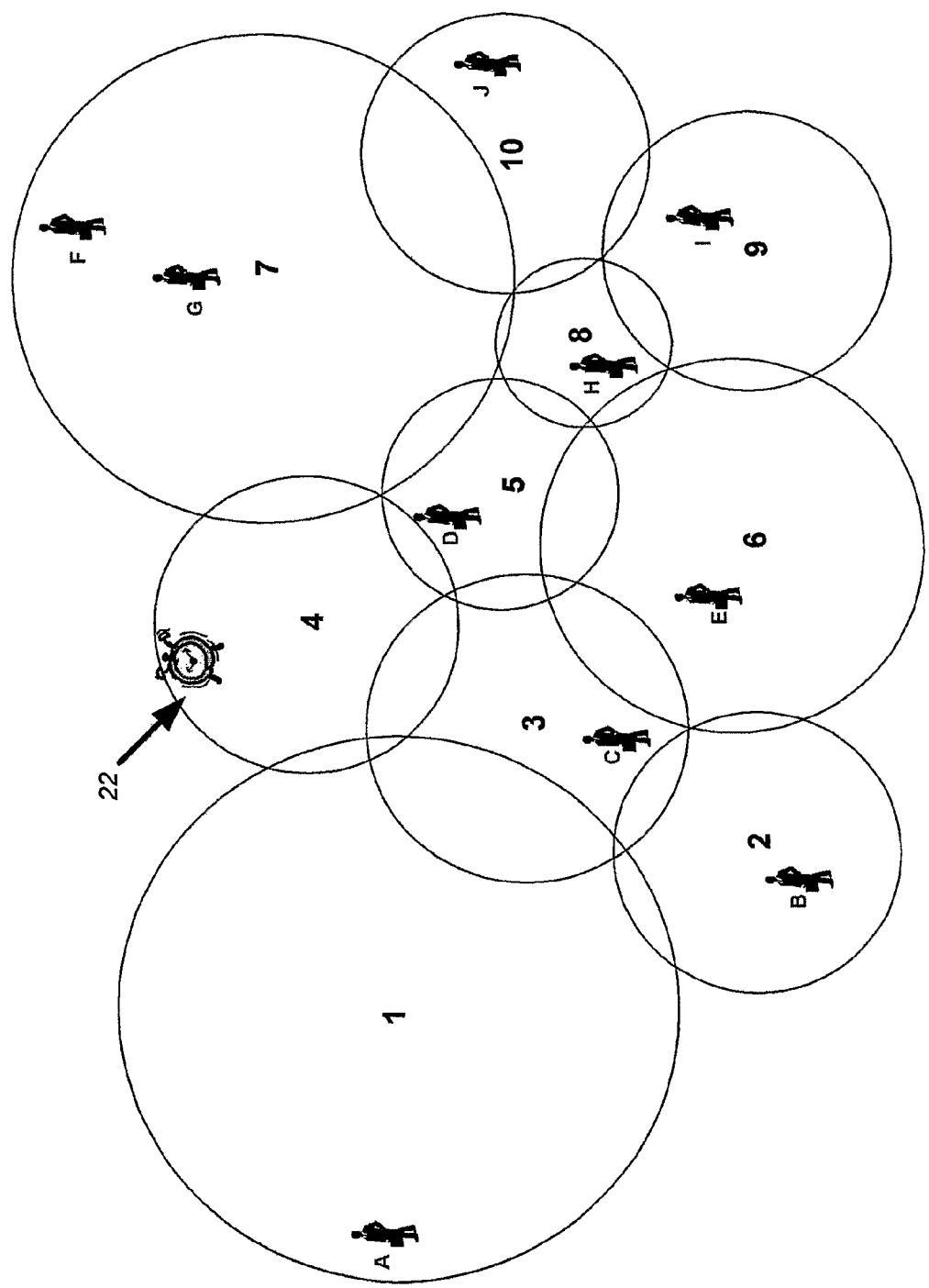
FIG. 2 shows an exemplary situation sketch for an application of a first embodiment of the present method.

FIG. 2 schematically shows a part of the network coverage area 15 of FIG. 1. A set of cells 1-10 are shown, each represented by a circular coverage area (of which some overlap. The skilled person will understand that other forms of coverage area for each cell may exist in reality, determined by cell antenna position and antenna environment. A point of interest for the embodiments of the present invention is indicated by reference numeral 22, of which the (geographical) location is assumed to be known. The point of interest 22 is a fixed location during execution of the present method, but may be associated with a (moving) mobile user terminal. The point of interest 22 is then the actual location of the mobile user terminal at the time of the start of the search according to an embodiment of the present invention. A number of user terminals A-J are present in the coverage area of cells 1-10, in the locations indicated.

The application running on the application server 11 may be arranged to execute a service, in which a user terminal 21 must be found which is nearest to the point of interest 22. Further applications may exist which require a group of n nearest user terminals 21 to be found, the implementation of which will be discussed with reference to other embodiments below. In the example shown, the coverage area searched is limited to the area covered by the set of cells 1-10, but it will be apparent that less or more cells of the total network may be included in the search for the nearest user terminal 21.

The point of interest 22 may be a person in need of urgent medical care, and the relevant user terminal 21 may then be a user terminal 21 which is known to be in the possession of a medical practitioner on duty. In order to be able to provide the necessary medical help as soon as possible, of course the nearest relevant user terminal 21 most be known (and contacted).

Other types of relevant or specific user terminals 21 may be defined, using a number of context criteria (i.e. specific user terminal roles). E.g. groups of user terminals 21 may be defined for medical emergency personnel, fire emergency personnel, police personnel, etc. The criteria may be determined at the start of the present method, e.g. when the application has established which criteria are to be used in a specific case. The second unit 13 may be arranged to determine which user terminal 21 in which cell 1-10 is a specific user terminal 21. This can be executed continuously in the second unit 13, but may also be executed only after having received user terminal data in response to a cell data request. Most telecommunication networks will be capable of providing such information, although different types of networks might perform this function differently. Several alternatives exist: Cell changes are communicated to a central point in the network where a mapping from cell to users is maintained. In an alternative embodiment, base stations in each cell of a cellular telephony network maintain a list of the users they service, which base stations can be queried by the second unit 13. In an even further alternative, a broadcast channel in the telecommunication network is used to page all user terminals in a particular cell 1-10 to provide the information requested by the second unit 13.

The last alternative is applicable to GSM networks. In phase 2 of the GSM standard the SMS Cell Broadcast is defined that enables sending an SMS to all users in a particular area (GSM 03.41 and GSM 03.49). Users can selectively accept or reject the message based on the message class. A specific emergency class can be used that is typically ignored by normal users.

Note that there is a different cost for each of the alternatives. In the first alternative there is a continuous cost because each cell change must be communicated. The second alternative does not have any additional cost since the base stations already have the right information. The third alternative has a more variable cost for each time that a cell is queried.

Because each user terminal 21 is in a cell 1-10, the user terminal's approximate location is known (the coverage area of that cell), and thus for each cell 1-10 a distance range to the point of interest 22 can be calculated. Only cells 1-10 that comprise relevant (or specific) user terminals 21 are evaluated. When the point of interest 22 resides in one or more cells 1-10 that comprise relevant user terminals 21, it will be determined for all of these cells 1-10 which relevant user terminal 21 is the closest to the point of interest 22. The distance to this user terminal 21 is the starting upper limit of a search range for evaluating further cells 1-10 comprising relevant user terminals 21 that are closer to the point of interest 22 then this upper limit. The cell 1-10 that is closest to the point of interest 22 and within the upper limit is evaluated first, because that cell 1-10 potentially comprises the closest relevant user terminal 21. This strategy of evaluating the closest cell 1-10 from the point of interest 22 is repeated until the closest user terminal 21 is found.

The embodiments of the present invention relate to determining a distance from a user terminal 21 to a point of interest 22. In FIG. 3a-3e the method according to a first embodiment of the present invention is explained using one dimensional graphs representing the situation sketch of FIG. 2. For each cell 1-10, the range of possible distances to the point of interest 22 is given as a line between a minimum value and a maximum value, and the actual distance between a specific user terminal 21 (indicated by letters A-J) by a circle on that line. The various cells are given in the x-direction (cell #) and the distance to the point of interest 22 in the y direction.

Figure 3A:
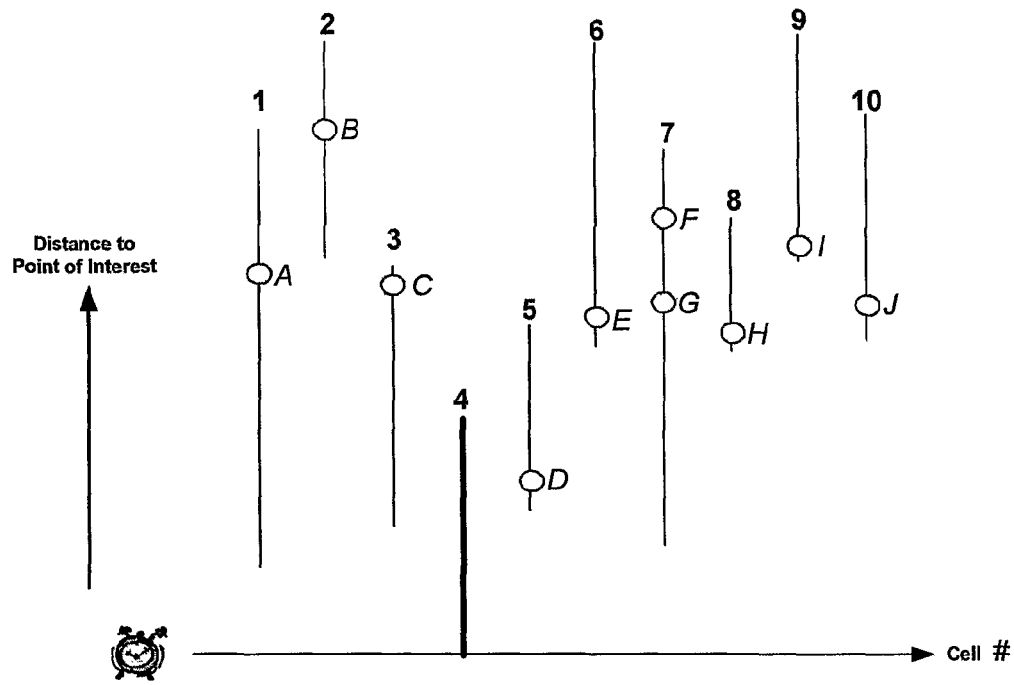
FIG. 3a-3e show one dimensional range graphs of the situation sketch of FIG. 2 for explaining a first embodiment of the present invention.
Figure 3B:
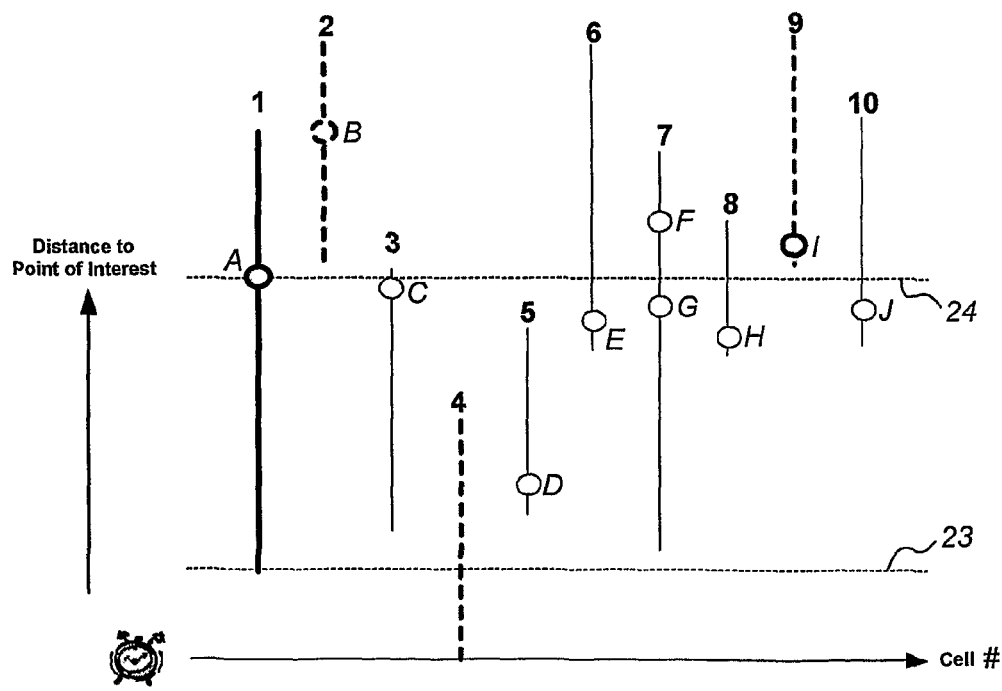

The starting point for finding the closest relevant (or specific) user terminal 21 is shown in FIG. 3a. Finding the closest relevant user terminal 21 is based on first finding the closest cell 4 to the point of interest 22, because this cell 4 potentially contains the closest user terminal 21 (indicated by bold line). A cell data request is transmitted in the closest cell 4 (current search cell) to determine whether any relevant user terminal 21 is present in cell 4, and to obtain data associated with the found user terminals 21. As part of the cell data request, a location request may be transmitted to obtain location data regarding relevant user terminals 21.

Step 1 (see FIG. 3b) determines the next closest cell containing potential relevant user terminals 21, which results in cell 1 (indicated by bold line) containing one relevant user terminal A, since the closest cell 4 (cell comprising the point of interest 22) does not contain any relevant user terminals 21. Again, a cell data request is transmitted to obtain data relating to relevant user terminals 21 in cell 1.

The horizontal dashed lines 23, 24 indicate the distance search range that remains to be searched (23 indicating the lower limit and 24 the upper limit of the search range). The closest user terminal A in cell 1 forms an input to adjust the search range limits 23, 24 and to subsequently filter out cell 2 and 9 (see dashed lines in FIG. 3b).

Figure 3C:
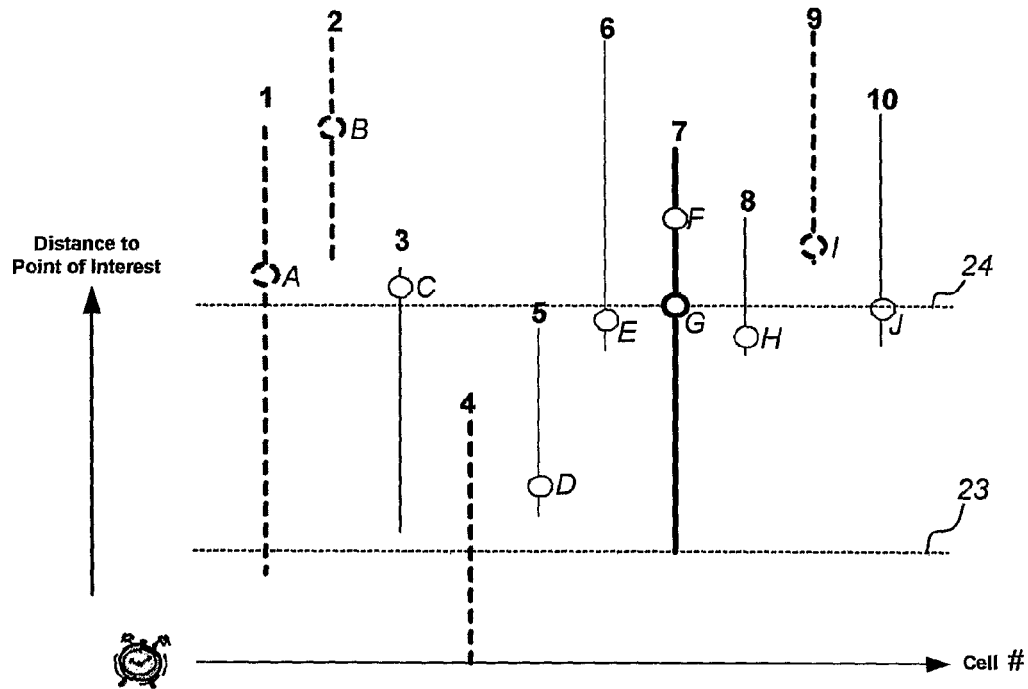
Figure 3D:
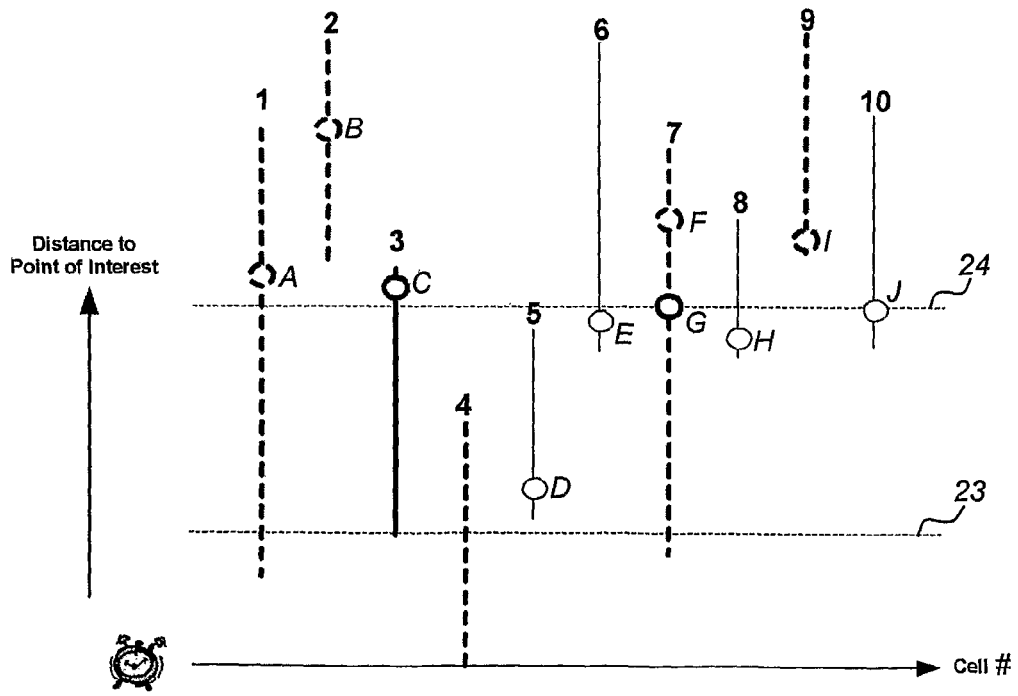
Figure 3E:
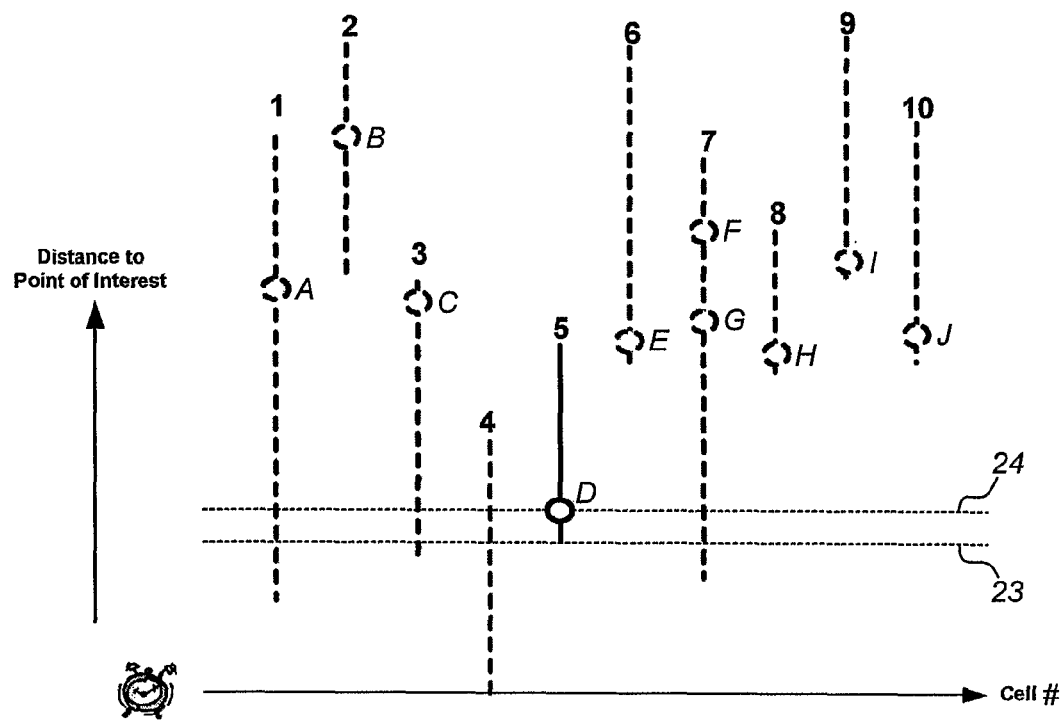

In a next step again the next closest cell comprising potential relevant user terminals 21 is determined, which results in cell 7 being found (bold line in FIG. 3c). Another cell data request in this cell 7 provides data relating to two relevant user terminals 21 F and G (FIG. 3c). The upper limit 24 of the search range is adapted to the minimum distance of one of the relevant user terminals 21 in cell 7, in this case the distance to user terminal G.

In a following step (see FIG. 3d) again the next closest cell comprising potential relevant user terminals 21 is determined, which results in cell 3 containing 1 relevant user terminal C (which is found using a cell data request). The lower limit 23 of the search range is adapted to the minimum distance in the range of cell 3. This user terminal C is however not closer to the point of interest then the user terminal G in cell 7, and therefore the upper limit 24 of the search range remains at the same level.

Subsequently, again the closest cell comprising potential relevant user terminals 21 is determined (FIG. 3e), which results in cell 5 comprising one relevant user terminal D (after another cell data request). The lower limit 23 of the search range is adapted to the lowest value of ranges associated with cell 5. Then, the closest user terminal D in cell 5 forms input to adapt the upper limit 24 of the search range and to filter out the remaining cells 6, 8 and 10 (see FIG. 3e).

In the above example four steps and five location requests are required to determine the closest user terminal 21 (D) instead of doing a location request to all ten user terminals A-J (or all cells 1-10) and determining which one of the user terminals A-J is the closest to the point of interest 22.

In other words, in subsequent steps, first a current search cell 1-10 is found, which has the lowest minimum value higher than the lower limit 23 and lower than the upper limit 24. In the initial run, this will be the cell in which the point of interest 22 resides, and in subsequent runs, this will exclude cells 1-10 of which the minimum distance value is outside the search range. Then, the lower limit 23 is reset to this lowest minimum value of the current search cell. Subsequently, the current search cell is queried for user data relating to user terminals 21 in that cell. From the user data, the distance between a user terminal 21 and the point of interest 22 may be calculated. If a user terminal 21 is found, the upper limit 24 is adjusted to the distance from that user terminal 21 to the point of interest 22 (or to the lowest distance in case of more than one specific user terminal in that cell). These subsequent steps are repeated until no further current search cell can be found.

As an alternative to the use of the lower limit 23 of the search range, it is possible to register which of the cells 1-10 have already been searched, and to find the cell 1-10 having the next lowest minimum value in the next iteration.

In the case that two (or more) different cells 1-10 have an equal minimum value of the possible distance range to the point of interest 22, the different cells may be regarded as a single search cell. The lower limit 23 of the search range is adapted accordingly, and all actual cells 1-10 of the search cell are queried for user data related to user terminals 21.

In a further embodiment, the method is adapted to take into account overlapping coverage areas of neighbouring cells. A situation in which this is applicable is shown schematically in FIG. 4. Only three cells 1-3 of the telecommunication network are shown. A point of interest 22 is present in the coverage area of cell 1, in which further no relevant user terminal 21 is present. Cell 2 has a large area of coverage overlapping with cell 1, and cell 3 has a smaller area of overlap with cell 1. Relevant user terminal A is located within the coverage area of cell 2, and relevant user terminal B is located within the coverage area of cell 3. The situation is also shown as one dimensional ranges in the diagram of FIG. 5.

Usually a particular user terminal 21 is returned by exactly one cell 1-3 by the second unit 13, the cell in which the user terminal 21 is being serviced. However, since cells 1-3 actually overlap, it is possible that more than one cell query returns the same user terminal 21. If the cell query function is capable of reflecting this, excluding the overlapping areas can further optimize the method.

Figure 4:
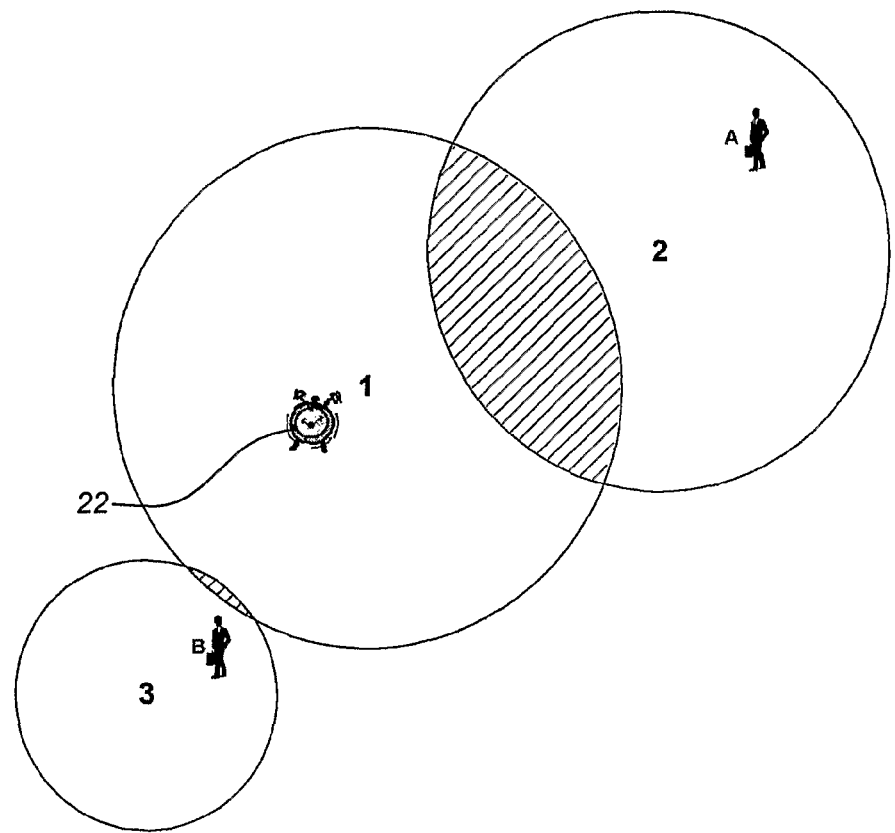
FIG. 4 shows a further exemplary situation sketch for an application of a second embodiment of the present method.
Figure 5:
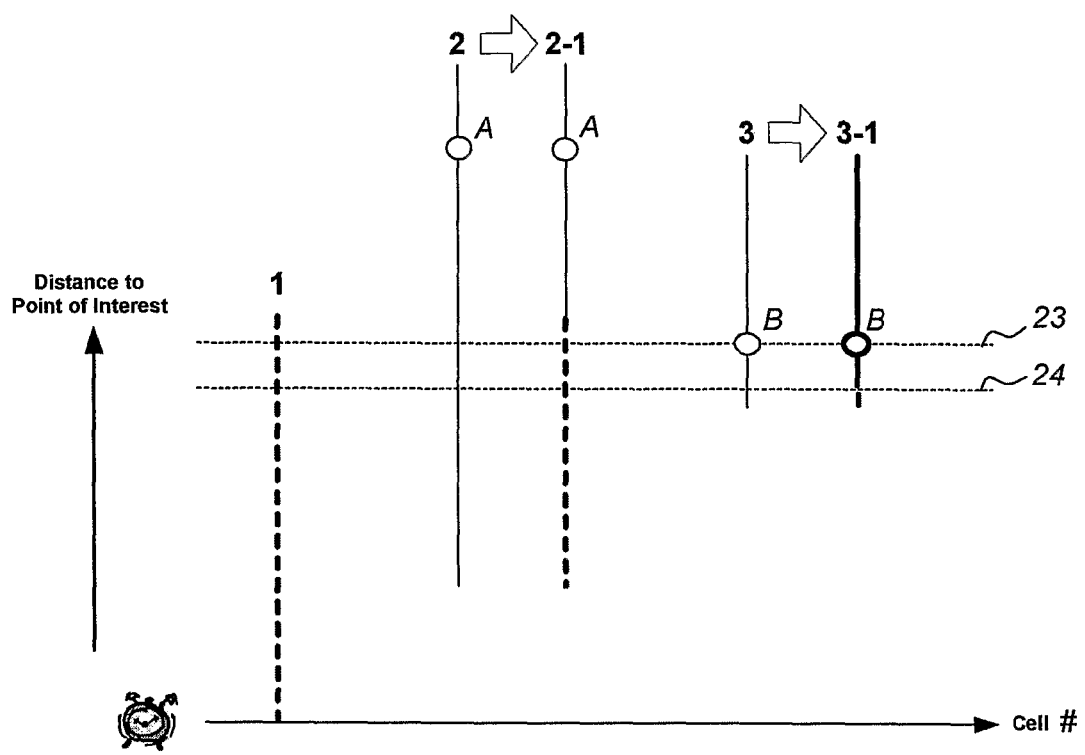
FIG. 5 shows a one dimensional range graph of the situation sketch of FIG. 4 for explaining a second embodiment of the present invention.

In the example shown in FIGS. 4 and 5, the point of interest 22 resides in cell 1 that does not contain any user terminals 21 (as found using a cell data request), so either cell 2 or cell 3 needs to be investigated next. The closest cell to the point of interest is cell 2. However, because it was determined that there is no relevant user in cell 1, a large part of cell 2 can be excluded. If the intersection of cell 1 and cell 2 is excluded (as well as the intersection of cell 1 and cell 3, however small), then cell 3 is actually closer to the point of interest and therefore more interesting to search first.

As shown in FIG. 5, initially cell 1 is evaluated (and excluded as indicated by the broken line). Before doing the next evaluation, first the intersections with cell 1 are excluded from the remaining cells (2 and 3), as indicated by the line 2-1 and 3-1 (part of the distance range of cell 2 and cell 3 are left out as indicated by the broken line parts). Only after that, the next cell is selected and evaluated, which is now cell 3 instead of cell 2. The lower limit 23 of the search range is adapted to the minimum considered distance of cell 3, a query for user terminal information is sent for cell 3, and the upper limit 24 of the search range is adapted to the distance of user terminal B. Using the adapted search range, cell 2 (or cell 2-1) is excluded from further search, and no location request or query is sent to cell 2.

When more than one single nearest user terminal is needed by the application running in the application server 11, the above embodiments may be executed more than once (n times) in a subsequent fashion, each time with exclusion of the last found then nearest user terminal 21. This assures that indeed the nearest n user terminals 21 are found.

As an alternative, the same method variants as described above for finding a single closest user terminal may be used to determine a group of n multiple relevant user terminals as close as possible to a point of interest 22 (n being an integer value). The only difference is that further cells are examined until the required number of n relevant user terminals 21 is found and no cells are closer to the point of interest than the relevant user terminal with the greatest distance to the point of interest 22. In other words, the upper limit 24 of the search range is only adjusted once the required number of n relevant user terminals 21 has been found, and the upper limit 24 is then adjusted to the $n^{th}$ lowest distance between each of the relevant user terminals 21 and the point of interest 22.

As an example, cells 1-10 are examined for relevant user terminals 21 until at least two user terminals 21 are found (and stored as a set of found user terminals 21). The found user terminal 21 that is second in distance from the point of interest 22 determines whether new cells (that have not yet been examined) exist which are closer to the point of interest 22 and need to be examined for relevant user terminals 21. The set of the two closest relevant user terminals 21 is updated after each iteration, e.g. by storing a set of found user terminals 21. This eventually guarantees finding the two closest relevant user terminals 21 to the point of interest 22.

In the example configuration discussed above with reference to FIG. 3a-3e, the following steps would be taken to find the two nearest user terminals 21 (n=2):

First a cell query is issued in the cell 4 nearest to the point of interest 22, which provides no relevant user terminals 21. The cell having the next lowest minimum value is cell 1, which provides user terminal A. User terminal A is added to the set of found user terminals 21, and the lower limit 23 is adjusted to the minimum value of cell 1. Next, the cell 7 having the next lowest minimum value larger than the lower limit 23 is queried, and user terminals F and G are added to the set of found user terminals. As this set now comprises more than the requested two user terminals 21, the upper limit 24 is set to the second lowest distance, i.e. the distance associated with user terminal A (from cell 1). All found user terminals 21 may be added to the set of found user terminals, or only the requested number of user terminals with the lowest distance to the point of interest 22 may be maintained in the set of found terminals (i.e. user terminal A and G). The further cells are queried in a similar manner (in the order cell 3, cell 5, cell 8, cell 6, cell 10) and in the final result, the two nearest user terminals D and H remain. Although in this example it requires eight cell queries to find the two nearest user terminals, it still provides an improvement over the otherwise required number of ten cell queries.

It could also occur that multiple different searches need to be performed for the same point of interest, e.g. if an ambulance and a policeman are needed for the same emergency. The present method allows the different searches (for different sets of criteria) to be performed simultaneously. A query in the current search cell provides data associated with user terminals 21 in the current search cell, and from this data, it is determined whether any relevant user terminal(s) 21 for each of the set of criteria is(are) present. By synchronizing the different searches, the method is further optimized by using a single cell query result for all searches that are performed simultaneously, reducing the number of cell queries required considerably in comparison with executing the method multiple times sequentially for each set of criteria.

The embodiments according to the present invention are able to deal with the fact that relevant user terminals 21 can have a fixed location and are not necessarily mobile user terminals 21. For this it is necessary that the cell query function as discussed above in relation to the various embodiments, returns data associated with relevant user terminals 21 with a fixed location as well as relevant mobile user terminals 21. This can e.g. be implemented by assigning a fixed user terminal 21 to a list of relevant user terminals 21 of the cell covering the geographical location of the fixed user terminal 21. Also, as an alternative, the distances between a (limited) list of fixed user terminals 21 and the point of interest 22 are determined beforehand, and are used in the method for determining the closest relevant user terminal 21.

The embodiments of the present invention are based on the assumption that it is possible to query which user terminals 21 reside in a particular cell 1-10. Most networks will be capable of providing such information, although different types of networks might perform this function differently. Several alternatives exist as described above. In the case that cell changes are communicated to a central point where a mapping from cell to user terminals is maintained then the cost can be derived as follows.

It shall be noted that user terminals that are of no interest will not cause any cell change events and are therefore not included in the 'subscribed users' (n).

The following table shows what parameters have impact on the cost in the network of this invention compared with traditional location requests.

| Identifier | Description |
|---|---|
| n | # of users subscribed to a service using this method |
| c | # of cell changes per second per subscribed user (=cell change rate) |
| e | # of cells in the network |
| a | # of cells used in the method |
| s | # of service requests per second (= service request rate) |
| C | Cell change cost |
| L | Location request cost |

Note that 'a' (the number of cells used in method) decreases as the number of users increases, because a subscribed user is found sooner. This means that the more subscribed users the fewer cells need to be examined, because more cells contain subscribed users.

The equation below describes the cost when the embodiments of the present invention are not used and a location request shall be done per subscribed user:

$$OldLocationRequestCost = n*s*L$$

The total cost of cell changes of all subscribed users is given as:

$$CellChangeCost = n*c*C$$

The equation below describes the location request cost for all subscribed users:

$$NewLocationRequestCost = CellChangeCost + n*s*\frac{a}{e}*L$$

$$NewLocationRequestCost = n*\left(c*C*\frac{s*a*L}{e}\right)$$

The equation below shows the profit per subscribed user:

$$Profit = OldLocationRequestCost - NewLocationRequestCost$$

$$Profit = (s*L) - \left(c*C*\frac{s*a*L}{e}\right)$$

$$Profit = s*L*\left(1-\frac{a}{e}\right) - c*C$$

The number of subscribed users (n) and the number of cells to be evaluated (a) in relation with the number of service requests (s) together determine whether the invention brings a profit or loss for the customer.

Also the difference in cost of a location request (L) and a cell change (C) can have a significant impact in profit/loss result.

For some applications in telecommunications networks searching for relevant user terminals 21 it is only relevant to find the closest relevant user terminal 21. The various embodiments of the present invention make sure that the applicable user terminal 21 is found using the cell identity (1-10) with as few location requests as possible given any user distribution. The various embodiments of the present invention also make sure that as many cells 1-10 as possible will be excluded before doing the actual location requests. This will result in fewer location requests and therefore less power and network resource usage.

The present invention has been explained above with reference to a number of exemplar embodiments. As will be apparent to the person skilled in the art, various modifications and amendments can be made without departing from the scope of the present invention, as defined in the appended claims.

The invention claimed is:

1. A method of determining a group of n user terminals in a telecommunication network which are closest to a point of interest, n being an integer value, the method comprising:
   a) determining a set of cells of the network, each having an associated distance range to the point of interest with a minimum and maximum value, and setting a search range with an upper limit;
   b) determining a current search cell of the set of cells which has the lowest minimum value lower than the upper limit;
   c) querying the current search cell for user data associated with user terminals in the current search cell, adding the user terminals to a set of found user terminals, and if the set of found user terminals comprises n or more user terminals, adjusting the upper limit of the search range to the $n^{th}$ lowest distance between each of the user terminals in the group and the point of interest;
   d) repeating the steps b) and c) until no further cell having a minimum value lower than the upper limit can be determined; and
   e) determining the group of n closest user terminals as the n user terminals in the queried cells having the n lowest distances to the point of interest.

2. The method according to claim 1, in which setting the search range comprises setting the upper limit equal to a predetermined maximum value.

3. The method according to claim 1, in which the current search cell comprises one or more cells having an equal minimum value.

4. The method according to claim 1, in which the user data comprises position data, and the position data is used to calculate the distance between the user terminal and the point of interest.

5. The method according to claim 1, in which the minimum value of a cell is adapted to exclude an overlapping area of a further cell closer to the point of interest.

6. The method according to claim 1, in which a user terminal comprises a terminal with a fixed and known location.

7. The method according to claim 1, in which a user terminal in a cell is only added to the set of found user terminals if the associated user data obtained from the current search cell matches a set of criteria.

8. The method according to claim 7, in which the method is performed in parallel for a number of different sets of criteria, using the same current search cell for each of the different sets of criteria.

9. A service node for a telecommunication network comprising a set of cells with a predetermined coverage area servicing user terminals, in which the service node is connected to an application server executing an application for determining a group of n user terminals which are closest to a point of interest in the predetermined coverage area, n being an integer value, the service node comprising:

means for connecting to a first network unit arranged to obtain information from the telecommunication network for determining a distance range to the point of interest with a minimum and maximum value for each one of the set of cells and a second network unit arranged to query a cell for user data associated with the user terminals being serviced in the cell; and means associated with the service node for:
  a) setting a search range with an upper limit;
  b) determining a current search cell of the set of cells which has the lowest minimum value lower than the upper limit;
  c) querying the second network unit for user data associated with user terminals in the current search cell, adding the user terminals to a set of found user terminals, and if the set of found user terminals comprises n or more user terminals adjusting the upper limit of the search range to the $n^{th}$ lowest distance between each of the user terminals in the group and the point of interest;
  d) repeating the steps b) and c) until no further cell having a minimum value lower than the upper limit can be determined; and
  e) determining the group of n closest user terminals as the n user terminals in the queried cells having the n lowest distances to the point of interest.

10. The service node according to claim 9, in which the service node is arranged to set the upper limit equal to a predetermined maximum value.

11. The service node according to claim 9, in which the current search cell comprises one or more cells having an equal minimum value.

12. The service node according to claim 9, in which the second network unit is arranged to obtain user data which comprises position data, and in which the service node is further arranged to use the position data to calculate the distance between the user terminal and the point of interest.

13. The service node according to claim 9, in which the service node is further arranged to adapt the minimum value of a cell to exclude an overlapping area of a further cell closer to the point of interest.

14. The service node according to claim 9, in which a user terminal comprises a terminal with a fixed and known location.

15. The service node according to claim 9, in which the service node is further arranged to add a user terminal to the set of found user terminals if the associated user data obtained from the second network unit matches a set of criteria.

16. The service node according to claim 15, in which the service node is arranged to execute multiple searches in parallel for a number of different sets of criteria, using the same current search cell for each of the different sets of criteria.

* * * * *

UNITED STATES PATENT AND TRADEMARK OFFICE
CERTIFICATE OF CORRECTION

| | | |
|---|---|---|
| PATENT NO. | : 8,036,684 B2 | Page 1 of 1 |
| APPLICATION NO. | : 11/996715 | |
| DATED | : October 11, 2011 | |
| INVENTOR(S) | : Hendriks et al. | |

It is certified that error appears in the above-identified patent and that said Letters Patent is hereby corrected as shown below:

In Column 3, Line 40, delete "Short description of drawings" and insert -- SHORT DESCRIPTION OF DRAWINGS --, therefor.

In Column 11, Line 24, in Claim 9, delete "terminals" and insert -- terminals, --, therefor.

Signed and Sealed this
Thirty-first Day of January, 2012

David J. Kappos
*Director of the United States Patent and Trademark Office*